(12) United States Patent
Beyer et al.

(10) Patent No.: US 7,133,765 B2
(45) Date of Patent: Nov. 7, 2006

(54) METHOD FOR CHECKING THE OPERABILITY OF AN AMBIENT PRESSURE SENSOR OF AN INTERNAL COMBUSTION ENGINE

(75) Inventors: Hans-Ernst Beyer, Sachsenheim (DE); Uwe Dworzak, Stuttgart (DE); Frank Kastner, Stuttgart (DE); Taskin Ege, Tamm (DE); Denis Kraemer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/520,885

(22) PCT Filed: Jun. 12, 2003

(86) PCT No.: PCT/DE03/01961

§ 371 (c)(1),
(2), (4) Date: May 17, 2005

(87) PCT Pub. No.: WO2004/005688

PCT Pub. Date: Jan. 15, 2004

(65) Prior Publication Data

US 2005/0234634 A1 Oct. 20, 2005

(30) Foreign Application Priority Data

Jul. 9, 2002 (DE) .................. 10230834.9

(51) Int. Cl.
*G06F 19/00* (2006.01)
*G01M 19/00* (2006.01)

(52) U.S. Cl. ..................... 701/114; 73/118.1
(58) Field of Classification Search ............... 101/114, 101/112, 102, 115, 99; 123/478, 479, 494; 73/117.3, 116, 118.1
See application file for complete search history.

(56) References Cited

U.S. PATENT DOCUMENTS

| 4,483,299 | A |   | 11/1984 | Kishi et al. .............. 123/479 |
| 4,664,090 | A | * | 5/1987  | Kabasin .................. 123/478 |
| 5,293,553 | A | * | 3/1994  | Dudek et al. ............. 701/102 |
| 5,394,331 | A | * | 2/1995  | Dudek et al. ............. 701/106 |
| 6,820,470 | B1 | * | 11/2004 | Shidara et al. ........... 73/117.3 |

FOREIGN PATENT DOCUMENTS

| DE | 197 45 698 | 4/1999 |
| DE | 100 21 639 | 1/2002 |
| EP | 1 245 812  | 10/2002 |

* cited by examiner

*Primary Examiner*—Hieu T. Vo
(74) *Attorney, Agent, or Firm*—Kenyon & Kenyon LLP

(57) ABSTRACT

A method for operating an internal combustion engine is described, in which the ambient pressure is determined by an ambient pressure sensor and the pressure in an intake manifold of the internal combustion engine is determined by an intake manifold pressure sensor. In this method the reliability performance of the ambient pressure sensor is checked by comparing the ambient pressure to a starting value that is obtained by the intake manifold pressure sensor before a starting process of the internal combustion engine. The comparison is only performed if a preceding check of the intake manifold pressure sensor yields the result that it is operational.

15 Claims, 3 Drawing Sheets

METHOD FOR CHECKING THE OPERABILITY OF AN AMBIENT PRESSURE SENSOR OF AN INTERNAL COMBUSTION ENGINE

FIELD OF THE INVENTION

The present invention is directed to a method for operating an internal combustion engine, in which the ambient pressure is determined by an ambient pressure sensor and the pressure in an intake manifold of the combustion engine is determined by an intake manifold pressure sensor, and in which the reliability performance of the ambient pressure sensor is checked by comparing the ambient pressure to a starting value that is obtained before or during the starting process of the combustion engine.

BACKGROUND INFORMATION

Such a method is described in German Published Patent Application No. 100 21 639. However, an additional signal may be required there, namely a modeled intake manifold pressure, in order to perform the check of the ambient pressure sensor.

SUMMARY OF THE INVENTION

The present invention provides an example method for operating an internal combustion engine, with which an easy and yet reliable check of the ambient pressure sensor may be provided.

According to an example embodiment of the present invention, in an example method of the type named at the beginning, by performing the comparison only if a preceding check of the intake manifold pressure sensor yields the result that it is operational.

According to an example embodiment of the present invention, it may be ensured that the check of the ambient pressure sensor is only performed if the intake manifold pressure sensor has been recognized as operational. If that is not the case, checking the ambient pressure sensor may not be possible. Thus, according to an example embodiment of the present invention this check is made dependent on one or more release conditions that must be fulfilled. This may ensure that the check of the ambient pressure sensor consistently yields a correct result. Furthermore, because of the prior release conditions the entire example method may remain simple and manageable.

Further features, possible applications, and advantages of the present invention derive from the following description of exemplary embodiments of the present invention, which are illustrated in the figures. All of the features described or illustrated represent the object of the present invention per se or in any combination, regardless of their summary in the patent claims or their back-references and regardless of their wording in the description or illustration in the drawing.

DETAILED DESCRIPTION

Figure 1:
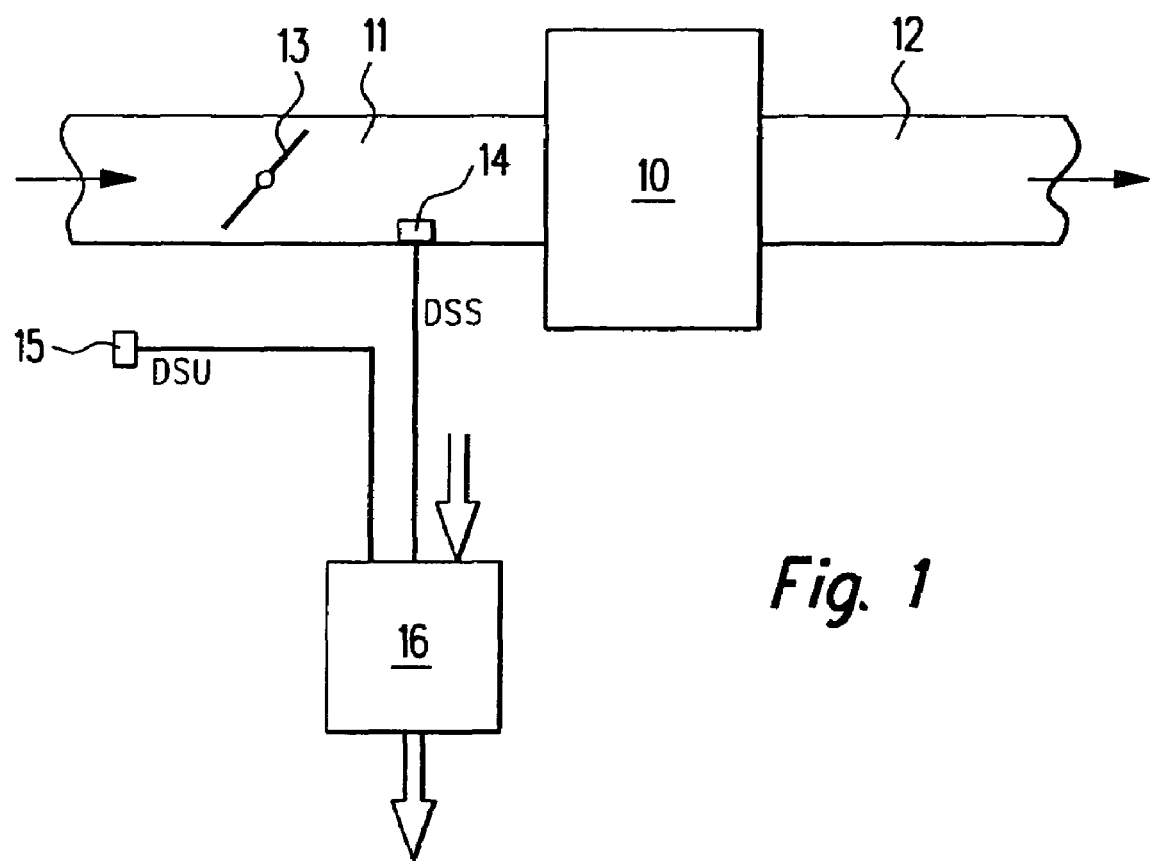
FIG. 1 shows a schematic block diagram of an exemplary embodiment of an internal combustion engine according to the present invention.

FIG. 1 illustrates an internal combustion engine 10, which is intended in particular for propelling a motor vehicle. Combustion engine 10 has an intake manifold 11 and an exhaust pipe 12. A throttle valve 13 is installed in intake manifold 11. Ambient air is supplied to combustion engine 10 through intake manifold 11. The quantity of air supplied may be influenced through throttle valve 13.

Positioned in intake manifold 11 downstream from throttle valve 13 in the intake direction is an intake manifold pressure sensor 14, which is provided for measuring the pressure in intake manifold 11. Outside of intake manifold 11 there is an ambient pressure sensor 15 for measuring the ambient pressure.

Intake manifold pressure sensor 14 produces a signal DSS, and ambient pressure sensor 15 produces a signal DSU. Both signals DSS, DSU are fed to an electronic control unit 16 which, depending in part on signals DSS, DSU, controls and/or regulates the operating variables of internal combustion engine 10.

To diagnose the reliability performance of ambient pressure sensor 15, the following example method is performed by control unit 16. The example method is stored as a computer program on an electric storage medium, for example a flash memory, and is performed by a computer of control unit 16 by executing the individual program commands.

In this example method, release conditions are first checked, after which, if the release conditions are fulfilled, the check of ambient pressure sensor 15 is performed. The check of the release conditions is explained below on the basis of FIGS. 2 and 3. The check of ambient pressure sensor 15 takes place at the end in FIG. 3.

Figure 2:
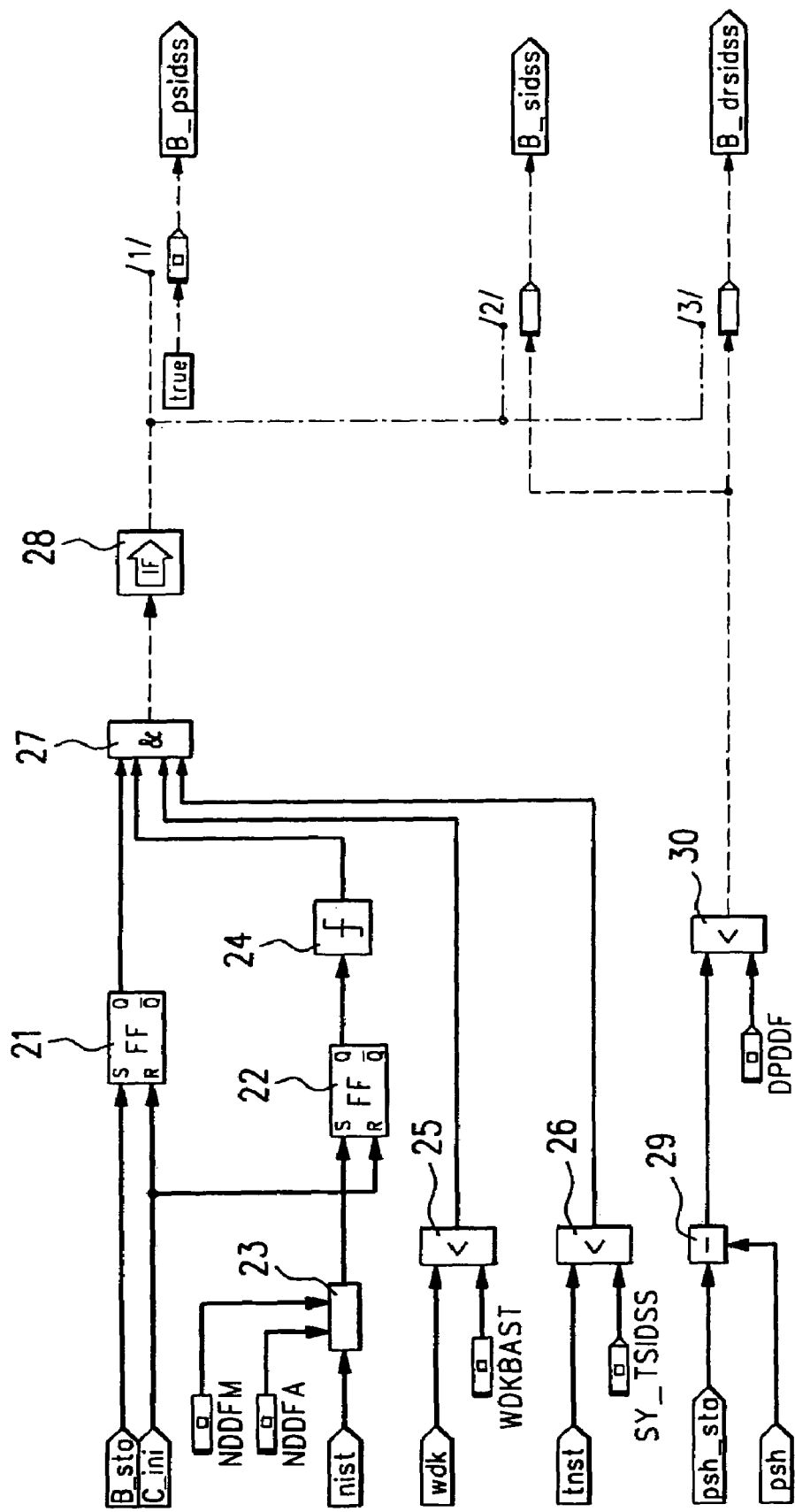
FIGS. 2 and 3 show schematic flow charts of an exemplary embodiment of a method for operating the internal combustion engine of FIG. 1.

In FIG. 2 there is a bit C_ini, which has a positive slope when the ignition of combustion engine 10 is first switched on. The positive slope results generally in control unit 16 being initialized. Specifically, the positive slope of bit C_ini results in a flip-flop 21 and a flip-flop 22 of FIG. 2 being reset.

Flip-flop 21 is set if a bit B_sta has a positive slope. This is the case when a starting process of internal combustion engine 10 is triggered by control unit 16. This is the case if certain starting conditions are fulfilled. For example, a starting process may need to have been initiated by the driver, an automatic transmission may be required so be in "park," and so on.

If flip-flop 21 has been set by bit B_sta, its output is HIGH.

Flip-flop 22 is set if the speed of internal combustion engine 10 is within a prescribed speed range. This speed range is oriented toward the actual speed that internal combustion engine 10 should have in the starting process. The speed range is defined by an upper value NDDFM and a lower value NDDFA, which are present at a comparator 23. Comparator 23 checks whether the actual speed nist of internal combustion engine 10 is between the two values NDDFM, NDDFA, and hence within the desired speed range.

If flip-flop 22 has been set in this manner, a HIGH signal is present at its output, whose rising slope is relayed through a slope detector 24.

Actual angle wdk of throttle valve 13 is compared to a prescribed maximum throttle valve angle WDKBAST by a comparator 25. If actual angle WDK is smaller than this maximum throttle valve angle WDKBAST, the output of comparator 25 is HIGH.

Actual duration tnst of the starting process is compared to a prescribed maximum duration SY_TSIDSS by a comparator 26. If duration tnst is shorter than this maximum duration SY_TSIDSS, the output of comparator 26 is HIGH.

The outputs of flip-flop 21, slope detector 24, and the two comparators 25, 26 are sent to an AND gate 27. If all four inputs of AND gate 27 are HIGH, its output is also HIGH.

This is the case when i) the ignition of internal combustion engine 10 is just turned on, ii) a starting process is triggered by control unit 16, iii) the actual speed of internal combustion engine 10 is within a desired speed range, iv) throttle valve 13 is open no wider than the maximum throttle valve angle, and v) the starting process has not yet exceeded the prescribed duration.

This is a first part of the aforementioned release conditions that may be required to be fulfilled for the check of ambient pressure sensor 15 to be performed. If the conditions are fulfilled and the output of AND gate 27 is HIGH, this is recognized by function 28 and is further processed as part of the measures identified with /1/, /2/, and /3/ in FIG. 2.

In measure /1/ a bit B_psidss, which indicates whether the check of ambient pressure sensor 15 may take place, is set to "true=one." This is the case when all release conditions are fulfilled and the output of AND gate 27 is HIGH.

Measures /2/ and /3/ relate to intake manifold pressure sensor 14. Its signal DSS is used by control unit 16 to produce a pressure psh in intake manifold 11.

Before a starting process of internal combustion engine 10, i.e., when internal combustion engine 10 is off, pressure psh in intake manifold 11 and in particular also the pressure downstream from throttle valve 13 is approximately the same as the ambient pressure because internal combustion engine 10 is at rest. This is equivalent to pressure psh measured by intake manifold pressure sensor 14 before a starting process being approximately the same as the ambient pressure. This pressure psh measured by intake manifold pressure sensor 14 before the starting process may thus be used to diagnose ambient pressure sensor 15.

To this end, pressure psh measured by intake manifold pressure sensor 14 before the starting process is stored by control unit 16 as starting value psh_sta. The storage process may be carried out until the starting process, in particular until power is supplied to the starter.

According to FIG. 2, current pressure psh in intake manifold 11 is subtracted from stored starting value psh_sta by a block 29. The difference is then compared to a prescribed minimum value DPDDF by a comparator 30. If the difference is smaller than minimum value DPDDF, the output of comparator 30 is HIGH.

In this check it may be assumed that the pressure in intake manifold 11 drops sharply after the beginning of the starting process. Thus the difference between current pressure psh and stored starting value psh_sta must be large. If this is the case, i.e., if minimum value DPDDF is exceeded, it may be concluded therefrom that intake manifold pressure sensor 14 is operational.

The HIGH signal at the output of comparator 30 results in bits B_sidss and B_drsidss being set to "true=one." This is equivalent to a defect in intake manifold pressure sensor 14. If the output of comparator 30 is LOW, the forenamed bits are set to "false=zero," which signals the reliability performance of intake manifold pressure sensor 14.

Bit B_sidss is intended to be further processed by control unit 16. Among other things, bits B_elm and E_ds, explained below, are based on this bit B_sidss. Bit B_drsidss is stored, and may be used for example in conjunction with an inspection or repair of internal combustion engine 10 to direct the testing personnel to the defective intake manifold pressure sensor 14.

Let it be pointed out again that measures /1/, /2/, and /3/ are carried out only if the described release conditions are fulfilled and the output of AND gate 27 is HIGH.

Figure 3:
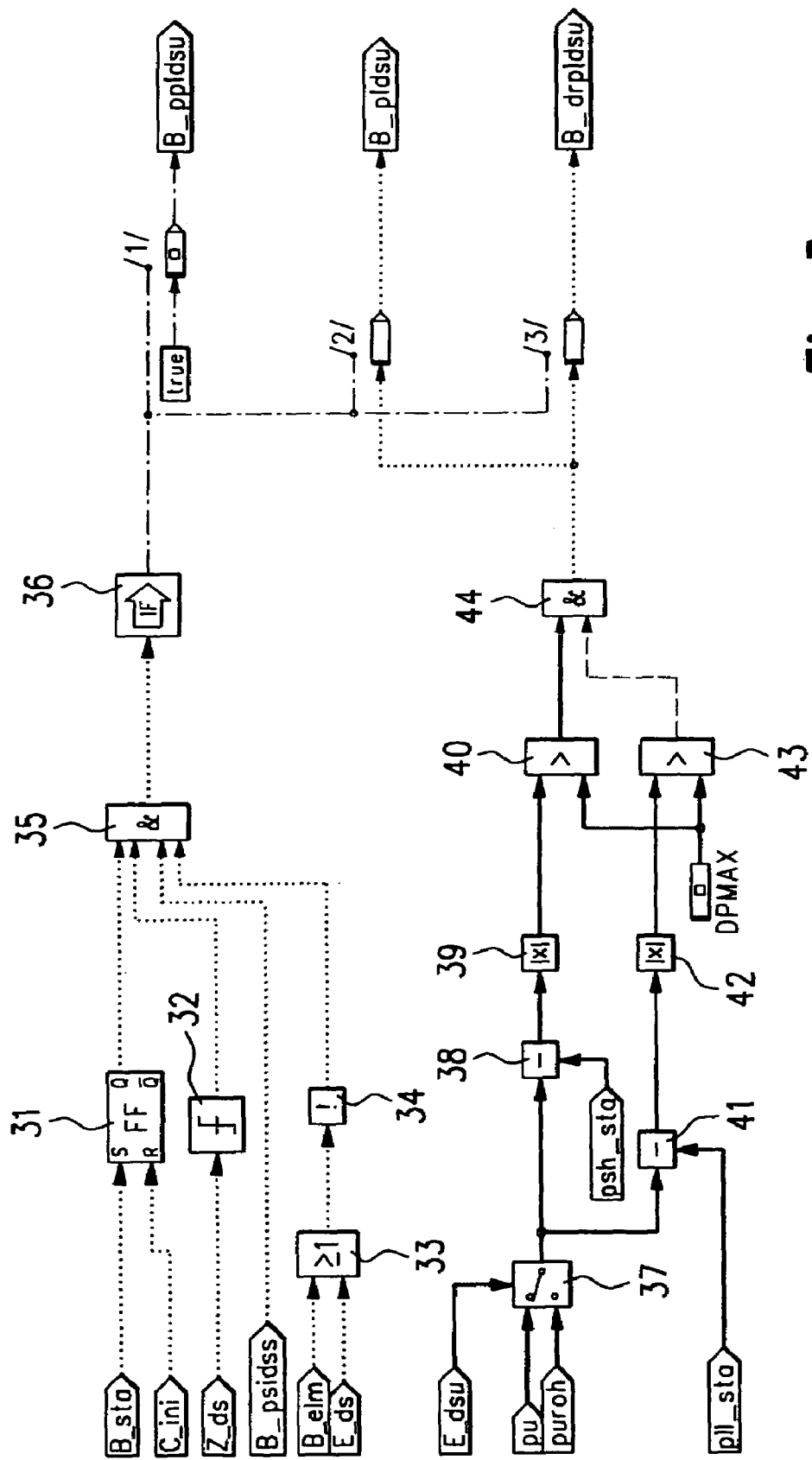

In FIG. 3 there is a flip-flop 31, which processes bits B_sta and C_ini in the same manner as explained earlier in connection with flip-flop 21 of FIG. 2. Thus the output of flip-flop 31 is HIGH if the ignition has just been turned on and if a starting process has been triggered.

A slope detector 32 is fed a bit Z_ds that indicates whether a diagnosis of intake manifold pressure sensor 14 has been performed. If so, the output of slope detector 32 goes HIGH. The diagnosis of intake manifold pressure sensor 14 may involve not only checking current pressure psh and stored starting value psh_sta, as explained in connection with measures /2/ and /3/ of FIG. 2. Instead, it may involve any alternative or supplemental test with which the reliability performance of intake manifold pressure sensor 14 may be checked.

Bit B_psidss indicated in FIG. 3 corresponds to the same bit that was explained in connection with measure /1/ of FIG. 2.

Also present in FIG. 3 is an OR element 33, to which aforementioned bits B_elm and E_ds are fed. If there is a HIGH signal at one of the two inputs of the OR element, this indicates that there is an error in connection with intake manifold pressure sensor 14. The output of OR element 33 is thus also HIGH. The result of subsequent inverter 34 is that its output is LOW.

In the opposite case, i.e., if intake manifold pressure sensor 14 is operational, the inputs of OR element 33 are LOW, so that its output is likewise LOW. The output of inverter 34 is thus HIGH.

The outputs of flip-flop 31, slope detector 32, inverter 34, and bit B_psidss are sent to an AND gate 35. If all four inputs of AND gate 35 are HIGH, its output is also HIGH.

This is the case when i) the ignition of internal combustion engine 10 is turned on again, ii) a starting process is triggered by control unit 16, iii) a check of intake manifold pressure sensor 14 has been performed, iv) the release conditions explained in connection with FIG. 2 have been fulfilled successfully, and v) intake manifold pressure sensor 14 is operational.

This is a second part of the aforementioned release conditions that may be required to be fulfilled for the check of ambient pressure sensor 15 to be performed. If the conditions are fulfilled and the output of AND gate 35 is HIGH, this is detected by function 36 and is further processed as part of the measures identified with /1/, /2/, and /3/ in FIG. 3.

In measure /1/ a bit B_ppldsu, which indicates that the check of ambient pressure sensor 15 may take place, is set to "true=one." This is the case when all release conditions of FIG. 2 and all the above release conditions of FIG. 3 are fulfilled and the output of AND gate 35 is HIGH.

Measures /2/ and /3/ relate to the check of ambient pressure sensor 15. This check is explained below.

Control unit 16 uses signal DSU from ambient pressure sensor 15 to produce an ambient pressure pu. Also present in control unit 16 is a signal puroh, which represents the ambient pressure that has not been filtered or checked for plausibility. In addition, control unit 16 performs tests with which it determines whether signal DSU of ambient pressure sensor 15 is at all reasonable or plausible. The result of this test is present as bit E_dsu.

Ambient pressure pu and signal puroh are fed to a selector switch 37, which is controlled by bit E_dsu. If bit E_dsu indicates that ambient pressure sensor 15 is delivering a plausible signal DSU, then ambient pressure pu obtained from ambient pressure sensor 15 is relayed by selector switch 37. If not, signal puroh is relayed.

We shall assume now that the first case exists, and that ambient pressure pu obtained from ambient pressure sensor 15 is therefore present at the output of selector switch 37.

Stored starting value psh_sta is subtracted from ambient pressure pu by a block 38, according to FIG. 3. The absolute value is determined from the difference by a block 39. This result is compared to a maximum value DPMAX by a comparator 40. If the absolute value of the difference between ambient pressure pu and stored starting value psh_sta is greater than maximum value DPMAX, then the output of comparator 40 is HIGH.

Underlying the above procedure is the consideration, mentioned earlier, that starting value psh_sta measured by intake manifold pressure sensor 14 before the starting process and then stored is approximately the same as the ambient pressure. Thus if it is determined on the basis of the release conditions that intake manifold pressure sensor 14 is not defective, and that a correct starting process has taken place, then after this starting process ambient pressure pu obtained from ambient pressure sensor 15 must be approximately the same as stored starting value psh_sta.

At the same time, however, this indicates that the absolute value of the difference between ambient pressure pu and starting value psh_sta may only be very small. This is checked through the comparison with maximum value DPMAX. If maximum value DPMAX is not exceeded, it is concluded that ambient pressure sensor 15 is not defective. This is indicated by a LOW signal at the output of comparator 40. But if maximum value DPMAX is exceeded, a defect of ambient pressure sensor 15 is concluded, and the output of comparator 40 is HIGH.

In the case of a supercharged internal combustion engine 10, a starting value pll_sta is also subtracted from ambient pressure pu by a block 41, according to FIG. 3. Starting value pll_sta is comparable to starting value psh_sta. Both starting values are measured prior to the starting process and then stored. Because the two starting values are measured prior to the starting process, it is assumed that they are approximately the same as the ambient pressure. As explained earlier, starting value psh_sta is measured by intake manifold pressure sensor 14, whereas starting value pll_sta is measured by a charge air pressure sensor, which is located inside the device that is used to charge internal combustion engine 10.

The absolute value is determined by a block 42 from the difference between ambient pressure pu and stored starting value pll_sta. This result is then compared by a comparator 43 to maximum value DPMAX mentioned earlier. If the absolute value of the difference between ambient pressure pu and starting value pll_sta does not exceed maximum value DPMAX, it is concluded that ambient pressure sensor 15 is operational, and the output of comparator 43 is LOW.

The outputs of comparator 40 and comparator 43 act on an AND gate 44. If both of these outputs are HIGH, then the output of AND gate 44 is also HIGH.

It should be pointed out that the described check based on stored starting value pll_sta, i.e., based on the charge air pressure of a supercharged internal combustion engine 10, represents a possibility which may also be dispensed with. In that case, blocks 41, 42, 43, and 44 are not present. It is also possible, in all of the functions and measures that were explained earlier or still remain to be explained in connection with intake manifold pressure sensor 14, for this intake manifold pressure sensor 14 to be replaced by the forenamed charge air pressure sensor. In that case, the charge air pressure sensor represents an alternative to intake manifold pressure sensor 14 in regard to the check of the ambient pressure sensor.

A HIGH signal at the output of AND gate 44 results in bits B_pldsu and B_drpldsu being set to "true=one." This is equivalent to a defect in ambient pressure sensor 15. If the output of AND gate 44 is LOW, the forenamed bits are set to "false=zero," which signals the reliability performance of ambient pressure sensor 15.

Bit B_pldsu is intended to be further processed by control unit 16. Bit B_drpldsu is stored, and may be used for example in conjunction with an inspection or repair of internal combustion engine 10 to direct the testing personnel to defective ambient pressure sensor 15.

Let it be pointed out again that measures /1/, /2/, and /3/ of FIG. 3 are carried out only if the described release conditions of FIGS. 2 and 3 are fulfilled and the output of AND gate 35 is HIGH.

If ambient pressure sensor 15 has been detected as defective, it is possible to replace ambient pressure pu, itself obtained from ambient pressure sensor 15, in another manner. If intake manifold pressure sensor 14 has been recognized as operational, this may be accomplished by continuing to use starting value psh_sta, i.e., the pressure in intake manifold 11 prior to the starting process, as a constant ambient pressure. This replacement of ambient pressure pu by starting value psh_sta may then be repeated after each starting process. If ambient pressure sensor 15 should be recognized as operational again, the above replacement may be canceled.

The described method maybe suitable not only for checking ambient pressure sensor 15, but in general for checking any pressure sensor that comes into contact with the environment of internal combustion engine 10, at least before the latter is started. For example, a charge air pressure sensor or an air filter pressure sensor maybe suitable for sensing an ambient pressure before internal combustion engine 10 is started. This ambient pressure may then be compared (block 38) to starting value psh_sta determined by intake manifold pressure sensor 14, in accordance with the above description. That may be used to reach a conclusion about the reliability performance of the charge air pressure sensor or the air filter pressure sensor (block 40).

What is claimed is:

1. An internal combustion engine, comprising:
    an ambient pressure sensor to determine an ambient pressure;
    an intake manifold;
    an intake manifold pressure sensor to determine a pressure in the intake manifold, the intake manifold pressure sensor configured to obtain a starting value before a starting process of the internal combustion engine; and
    a control unit to check a reliability performance of the ambient pressure sensor, the control unit configured to compare the ambient pressure to the starting value;
    wherein the comparison is only performed if a preceding check of the reliability performance of the intake manifold pressure sensor yields a result that the intake manifold pressure sensor is operational.

2. The internal combustion engine of claim 1, wherein the internal combustion engine is configured for a motor vehicle.

3. A control unit for an internal combustion engine, comprising:
    an ambient pressure sensor to determine an ambient pressure;
    an intake manifold pressure sensor to determine a pressure in an intake manifold of the internal combustion engine, the pressure including a starting value determined before a starting process of the internal combustion engine; and an arrangement to check a reliability performance of the ambient pressure sensor by comparing the ambient pressure to the starting value,
wherein the comparison is only performed if a preceding check of the intake manifold pressure sensor yields the result that the intake manifold pressure sensor is operational.

4. A computer program product for use with a computer, the computer program product having program commands stored on a computer-readable medium for causing the computer to perform a method for operating an internal combustion engine, the method comprising:
determining an ambient pressure via an ambient pressure sensor;
determining a pressure in an intake manifold of the internal combustion engine via an intake manifold pressure sensor;
obtaining a starting value via the intake manifold pressure sensor before a starting processing of the internal combustion engine; and
checking a reliability performance of the ambient pressure sensor by comparing the ambient pressure to the starting value,
wherein the comparison is only performed if a preceding check of the intake manifold pressure sensor yields a result that the intake manifold pressure sensor is operational.

5. The computer program product of claim 4, wherein the computer-readable medium is an electronic storage medium.

6. The computer program product of claim 4, wherein the computer-readable medium is a flash memory.

7. A method for operating an internal combustion engine, comprising:
providing a pressure sensor in contact with an environment before a starting process of the internal combustion engine;
determining a corresponding pressure via the pressure sensor;
determining a pressure in an intake manifold of the internal combustion engine via an intake manifold pressure sensor; and
checking a reliability performance of the pressure sensor by comparing the pressure determined by the pressure sensor to a starting value that is obtained by the intake manifold pressure sensor before the starting process of the internal combustion engine,
wherein the comparison is only performed if a preceding check of the intake manifold pressure sensor yields the result that the intake manifold pressure sensor is operational.

8. The method of claim 7, wherein the pressure sensor includes one of an ambient pressure sensor, a charge air pressure sensor, and an air filter pressure sensor.

9. A method for operating an internal combustion engine, comprising:
determining an ambient pressure via an ambient pressure sensor;
determining a pressure in an intake manifold of the internal combustion engine via an intake manifold pressure sensor;
obtaining a starting value via the intake manifold pressure sensor before a starting process of the internal combustion engine; and
checking a reliability performance of the ambient pressure sensor by comparing the ambient pressure to the starting value,
wherein the comparison is only performed if a preceding check of the intake manifold pressure sensor yields a result that the intake manifold pressure sensor is operational.

10. The method of claim 9, wherein the result of the check of the intake manifold pressure sensor only continues to be used, if one or more of the following release conditions are fulfilled:
i) an ignition of the internal combustion engine has just been turned on;
ii) the starting process of the internal combustion engine has been triggered;
iii) an actual speed of the internal combustion engine is within a desired speed range;
iv) a throttle valve of the internal combustion engine is opened no wider than a maximum throttle valve angle; and
v) the starting process has not yet exceeded a prescribed duration.

11. The method of claim 9, wherein the check of the intake manifold pressure sensor includes:
detecting the starting value via the intake manifold pressure sensor before the starting process of the internal combustion engine;
storing the starting value;
after the starting process, comparing the starting value to the pressure in the intake manifold; and
recognizing the intake manifold pressure sensor as operational, if a difference of the starting value and the pressure in the intake manifold exceeds a minimum value.

12. The method of claim 9, wherein the comparison of the ambient pressure to the starting value is only performed if one or more of the following release conditions are fulfilled:
i) an ignition of the internal combustion engine has just been switched on;
ii) the starting process has been triggered;
iii) the check of the intake manifold pressure sensor has been performed; and
iv) the intake manifold pressure sensor is operational.

13. The method of claim 9, wherein a check of the ambient pressure sensor includes:
one of detecting and triggering the starting process of the internal combustion engine;
one of before and during the starting process, storing the intake manifold pressure detected by the intake manifold pressure sensor as the starting value;
comparing the stored starting value to the ambient pressure obtained from the ambient pressure sensor; and
recognizing the ambient pressure sensor as operational, if the difference of the starting value and the ambient pressure does not exceed a maximum value.

14. The method of claim 13, further comprising:
detecting a malfunction of the ambient pressure sensor when the stored starting value is used as the ambient pressure.

15. The method of claim 9, wherein one of in addition to and alternatively to obtaining the starting value from the intake manifold pressure sensor and storing the starting value, the starting value is obtained from a charge-air pressure sensor and stored before the starting process is used.

* * * * *